(12) United States Patent  (10) Patent No.: US 7,587,731 B1
Oyabu et al.  (45) Date of Patent: Sep. 8, 2009

(54) PROGRAM GUIDE INFORMATION PROVIDING DEVICE, PROGRAM DEVICE INFORMATION PROVIDING SYSTEM, INFORMATION RECEIVING DEVICE, REMOTE OPERATING SYSTEM, AND METHOD THEREOF

(75) Inventors: Tomoko Oyabu, Kanagawa (JP); Mitsuru Nagasaka, Kanagawa (JP); Aki Koyabu, Tokyo (JP); Tomoyuki Hanai, Kanagawa (JP)

(73) Assignee: Sony Corporation, Tokyo (JP)

( * ) Notice: Subject to any disclaimer, the term of this patent is extended or adjusted under 35 U.S.C. 154(b) by 760 days.

(21) Appl. No.: 09/627,725

(22) Filed: Jul. 28, 2000

(30) Foreign Application Priority Data

Jul. 30, 1999  (JP) ................................ 11-217773

(51) Int. Cl.
*H04N 7/16* (2006.01)
*H04M 1/663* (2006.01)
*H04W 4/00* (2009.01)

(52) U.S. Cl. .............................. 725/46; 725/39; 725/78; 725/80; 455/412.1; 455/412.2; 370/331

(58) Field of Classification Search ................... 725/46; 705/10, 14; 348/734; 455/412.1, 412.2; 370/331
See application file for complete search history.

(56) References Cited

U.S. PATENT DOCUMENTS

| | | | | |
|---|---|---|---|---|
| 5,444,499 A | * | 8/1995 | Saitoh | 348/734 |
| 5,625,669 A | * | 4/1997 | McGregor et al. | 455/418 |
| 5,663,756 A | * | 9/1997 | Blahut et al. | 348/5.5 |
| 5,710,605 A | * | 1/1998 | Nelson | 348/734 |
| 5,758,257 A | * | 5/1998 | Herz et al. | 725/116 |
| 5,903,845 A | * | 5/1999 | Buhrmann et al. | 455/461 |
| 5,980,261 A | * | 11/1999 | Mino et al. | 434/307 A |
| 5,983,214 A | * | 11/1999 | Lang et al. | 707/1 |
| 6,040,829 A | * | 3/2000 | Croy et al. | 345/864 |
| 6,088,722 A | * | 7/2000 | Herz et al. | 709/217 |
| 6,124,877 A | * | 9/2000 | Schmidt | 725/10 |
| 6,130,726 A | * | 10/2000 | Darbee et al. | 348/734 |
| 6,185,360 B1 | * | 2/2001 | Inoue et al. | 386/46 |
| 6,192,340 B1 | * | 2/2001 | Abecassis | 704/270 |
| 6,222,449 B1 | * | 4/2001 | Twining | 340/539.11 |
| 6,327,346 B1 | * | 12/2001 | Infosino | 379/88.02 |
| 6,359,661 B1 | * | 3/2002 | Nickum | 348/734 |
| 6,407,779 B1 | * | 6/2002 | Herz | 348/734 |
| 6,421,729 B1 | * | 7/2002 | Paltenghe et al. | 709/229 |

(Continued)

FOREIGN PATENT DOCUMENTS

JP  6 261139  9/1994

(Continued)

*Primary Examiner*—Son P Huynh
(74) *Attorney, Agent, or Firm*—Frommer Lawrence & Haug LLP; William S. Frommer; Thomas F. Presson

(57) ABSTRACT

A program guide information providing device is arranged so that reference information corresponding to identification information transmitted from a communication terminal device is read from preference information storage, programs matching the preferences of the user are searched from the program guide information based on the read preference information, searched program guide information is generated from the searched programs, and the searched program guide information is transmitted to the communication terminal device, thereby allowing the user to be provided with program guide information matching the preferences of the user, regardless of the location of the user using the communication terminal device.

40 Claims, 9 Drawing Sheets

U.S. PATENT DOCUMENTS

| | | | |
|---|---|---|---|
| 6,424,947 B1 * | 7/2002 | Tsuria et al. | 705/1 |
| 6,437,836 B1 * | 8/2002 | Huang et al. | 348/734 |
| 6,438,752 B1 * | 8/2002 | McClard | 725/46 |
| 6,445,306 B1 * | 9/2002 | Trovato et al. | 340/825.24 |
| 6,463,585 B1 * | 10/2002 | Hendricks et al. | 725/35 |
| 6,476,825 B1 * | 11/2002 | Croy et al. | 345/716 |
| 6,484,260 B1 * | 11/2002 | Scott et al. | 713/186 |
| 6,493,688 B1 * | 12/2002 | Das et al. | 706/20 |
| 6,505,348 B1 * | 1/2003 | Knowles et al. | 725/49 |
| 6,509,913 B2 * | 1/2003 | Martin et al. | 715/762 |
| 6,523,061 B1 * | 2/2003 | Halverson et al. | 709/202 |
| 6,526,129 B1 * | 2/2003 | Beaton et al. | 379/90.01 |
| 6,530,083 B1 * | 3/2003 | Liebenow | 725/46 |
| 6,542,758 B1 * | 4/2003 | Chennakeshu et al. | 455/569.2 |
| 6,581,207 B1 * | 6/2003 | Sumita et al. | 725/46 |
| 6,584,613 B1 * | 6/2003 | Dunn et al. | 725/122 |
| 6,611,654 B1 * | 8/2003 | Shteyn | 386/83 |
| 6,614,987 B1 * | 9/2003 | Ismail et al. | 386/83 |
| 6,622,017 B1 * | 9/2003 | Hoffman | 455/419 |
| 6,622,307 B1 * | 9/2003 | Ho | 725/120 |
| 6,633,227 B1 * | 10/2003 | Schmitz | 340/10.31 |
| 6,662,365 B1 * | 12/2003 | Sullivan et al. | 725/25 |
| 6,678,366 B1 * | 1/2004 | Burger et al. | 379/211.03 |
| 6,721,954 B1 * | 4/2004 | Nickum | 725/46 |
| 6,735,487 B1 * | 5/2004 | Marshall et al. | 700/90 |
| 6,796,555 B1 * | 9/2004 | Blahut | 370/395.1 |
| 6,868,225 B1 * | 3/2005 | Brown et al. | 386/83 |
| 6,901,261 B2 * | 5/2005 | Banatre et al. | 455/456.1 |
| 6,934,965 B2 * | 8/2005 | Gordon et al. | 725/54 |
| 7,185,355 B1 * | 2/2007 | Ellis et al. | 725/46 |
| 7,293,277 B1 * | 11/2007 | Nathan | 725/78 |
| 2003/0031465 A1 * | 2/2003 | Blake | 386/83 |
| 2003/0088872 A1 * | 5/2003 | Maissel et al. | 725/46 |
| 2003/0149988 A1 * | 8/2003 | Ellis et al. | 725/87 |
| 2004/0117831 A1 * | 6/2004 | Ellis et al. | 725/53 |
| 2005/0028208 A1 * | 2/2005 | Ellis et al. | 725/58 |
| 2005/0251827 A1 * | 11/2005 | Ellis et al. | 725/47 |
| 2005/0262542 A1 * | 11/2005 | DeWeese et al. | 725/106 |
| 2006/0271993 A1 * | 11/2006 | Nakata et al. | 725/131 |

FOREIGN PATENT DOCUMENTS

| | | | |
|---|---|---|---|
| JP | 9 102827 | | 4/1997 |
| JP | 10 271359 | | 10/1998 |
| JP | 10 294904 | | 11/1998 |
| JP | 11 41566 | | 2/1999 |
| JP | 2002 521874 | | 7/2002 |
| WO | WO 98/10589 | * | 3/1998 |

* cited by examiner

FIG. 3

| PROGRAM ID | PROGRAM ID DATA (CODE) |
|---|---|
| BROADCASTING STATION NO. | CHANNEL DATA (CODE) |
| BROADCASTING STATION NAME | TEXT DATA |
| START TIME | TIME DATA |
| DURATION (OR ENDING TIME) | TIME DATA |
| PROGRAM TITLE | TEXT DATA |
| PROGRAM SUB-TITLE | TEXT DATA |
| PROGRAM DESCRIPTION | TEXT DATA |
| GENRE | GENRE DATA (CODE) |

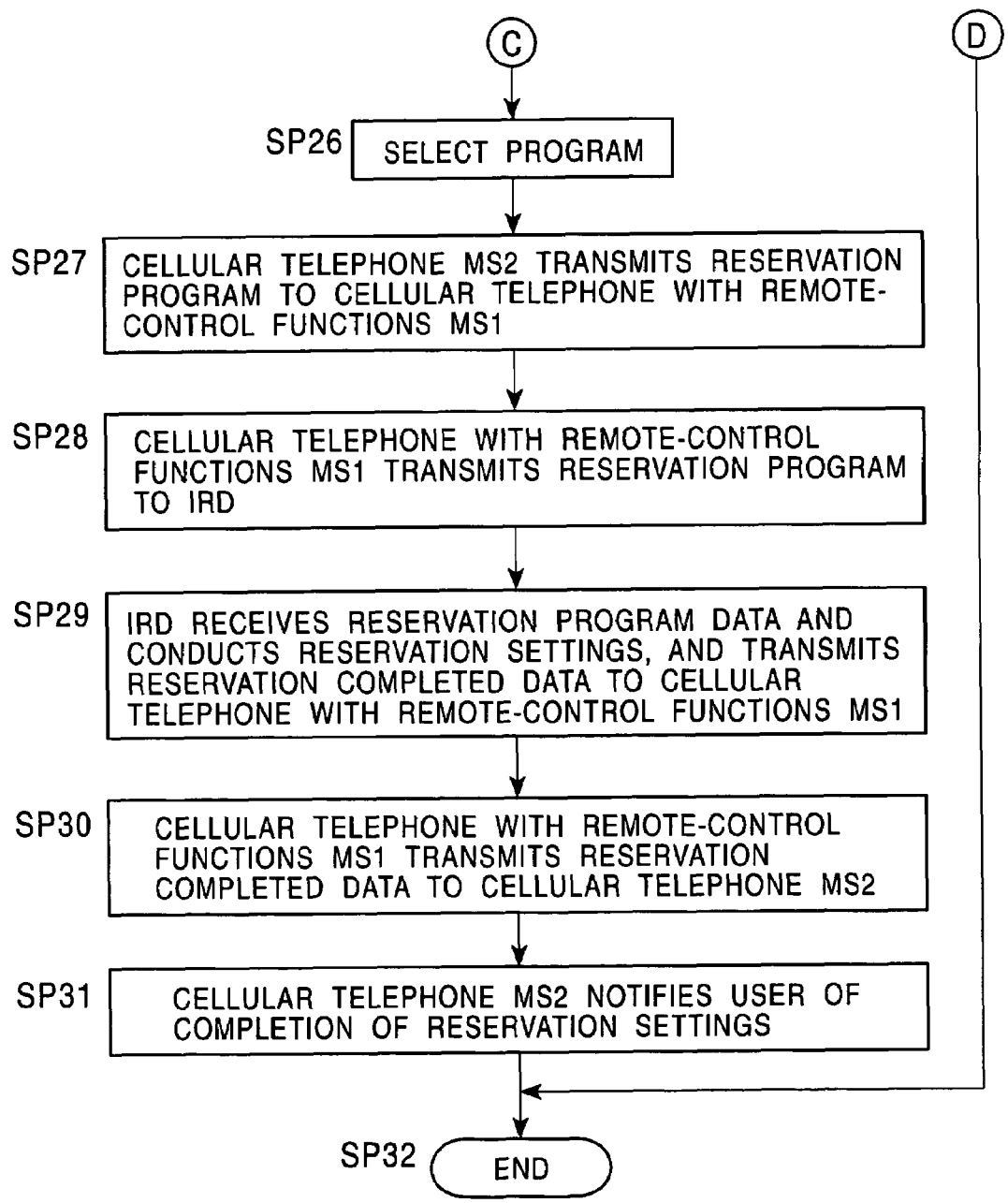

PROGRAM GUIDE INFORMATION PROVIDING DEVICE, PROGRAM DEVICE INFORMATION PROVIDING SYSTEM, INFORMATION RECEIVING DEVICE, REMOTE OPERATING SYSTEM, AND METHOD THEREOF

BACKGROUND OF THE INVENTION

1. Field of the Invention

The present invention relates to a program guide information providing device, a program guide information providing system, an information receiving device, a remote operating system, and the method for these, and is suitably applied to a receiver which receives broadcast waves transmitted from a broadcast station for example and which displays images according to the broadcast waves on a monitor.

2. Description of the Related Art

Conventionally, with broadcasting stations which perform broadcasting services using analog ground waves, usable frequency bands are appropriated beforehand, and the broadcasting stations transmit their own program data using the appropriated frequency bands. Receivers situated in the homes of viewers (hereafter referred to as IRDs (Integrated Receiver Decoders)) select program data from a desired broadcasting station from the multiple sets of program data sent from various broadcasting stations according to selecting operations made by viewers, and decode and display the program data from the selected broadcasting station on an external monitor.

Now, with regard to analog ground wave broadcasting systems, an arrangement is being proposed wherein data called electronic program guide information (hereafter referred to as EPG (Electronic Program Guide) data) indicating the contents of each program is periodically distributed from a specified broadcasting station, in order to notify viewers of the programs to be provided from each broadcasting station. This EPG data is made up of information such as the program title, date and time of broadcast, broadcasting channel, description of the program, etc., and serves as material whereby the viewers can decide which programs to watch.

In this case, the IRD receives and stores the EPG data periodically sent from the broadcasting station transmitting the EPG data in memory, reads the EPG data from the memory according to display operations made by the viewer, and displays this on the external monitor. Thus, the viewer can view the EPG data displayed on the monitor, and decide which program to watch.

At this time, in the event that the user performs a reserved recording setting operation for a program which the viewer desires to view, the IRD stores the program information such as data and time of the program and the channel in non-volatile memory, and shifts to a wait state for recording this program. Then, the IRD executes a recording action based on the program information stored in the non-volatile memory, such that the program which the viewer desires to watch is recorded on an internal recording medium.

Now, the EPG data contains information regarding an immense number of programs, but the monitor display screen for displaying the EPG data is limited, so the IRD can only display a portion of the program information for the immense number of programs on the monitor display screen. Accordingly, the viewer must perform a scrolling operation to search through the immense number of programs to find a desired program, which has been a problem in that the searching efficiency of finding a program to watch is poor. Also, in the event of multiple users sharing an IRD, each user records program data on the same recording medium, which means that the program data for each user exists on the same recording medium in mixed fashion, which has led to cases wherein a given user accidentally erases the program data which another user had recorded on the recording medium.

Further, remote commanders generally using infrared rays are employed as means for performing remote operation of the IRD, but the remote commander can only be used within a certain range from the IRD, so there is the need for the viewer to be in the home of the viewer where the IRD is installed in order to perform remote operation of the IRD, meaning that there have been restrictions on the locations where the remote command can be used.

SUMMARY OF THE INVENTION

The present invention has been made in light of the above, and accordingly, it is an object of the present invention to provide a program guide information providing device, a program guide information providing system, an information receiving device, a remote operating system, and the method for these, capable of providing the user with program guide information matching the preferences of the user, regardless of the location of the user using the communication terminal device.

The present invention made to solve such problems stores beforehand in program guide information storing means program guide information indicating the contents of programs to be supplied by predetermined program supplying means;

correlates preference information indicating the preferences of user using the communication terminal device with identification information appropriated to the communication terminal device, and stores the preference information beforehand in preference information storing means;

reads from the preference information storing means the preference information corresponding to the identification information transmitted from the communication terminal device;

searches programs matching the preferences of the user from the program guide information based on the read preference information;

generates searched program guide information comprising the searched programs; and transmits the searched program guide information to the communication terminal device;

thereby providing the user with program-guide information matching the preferences of the user, regardless of the location of the user using the communication terminal device.

BRIEF DESCRIPTION OF THE DRAWINGS

FIG. 3 is a table illustrating the contents of EPG data;

FIG. 9 is another flowchart illustrating the program reservation setting process procedures in the case of obtaining EPG data from an EPG server.

DESCRIPTION OF THE PREFERRED EMBODIMENTS

An embodiment of the present invention will now be described with reference to the drawings.

(1) Configuration of the Analog Ground Wave Broadcasting System

Figure 1:
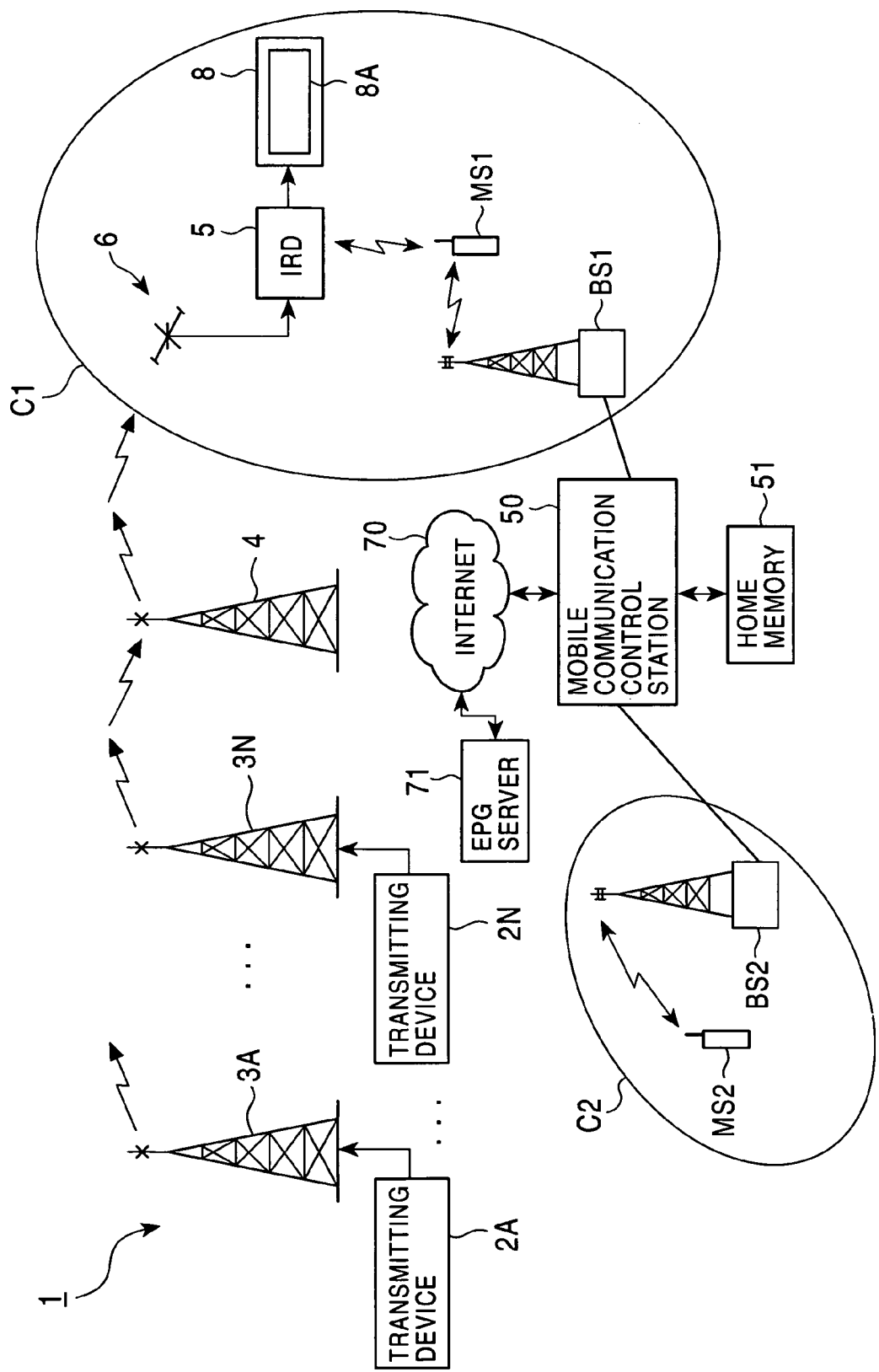
FIG. 1 is a block diagram illustrating the analog ground wave broadcasting system according to the present invention.

In FIG. 1, reference numeral 1 illustrates the overall configuration of the analog ground wave broadcasting system comprising a remote operating system, with the transmitting devices 2A through 2N serving as program supplying means installed at each broadcasting station transmitting picture signals and audio signals for the programs via the transmitting antennas 3A through 3N. The relay device 4 relays the broadcast waves transmitted from each of the transmitting devices 2A through 2N, and distributes these to the receivers 5 situated in the homes of viewers (hereafter referred to as IRDs (Integrated Receiver Decoders)).

The IRD 5 receives the broadcasting waves distributed from the multiple broadcasting stations with a receiving antenna 6, selects program data of the broadcasting station specified from the received program data of the multiple broadcasting stations according to selection operations made by the viewer (user) with a cellular telephone with remote commander functions (hereafter referred to as "cellular telephone with remote-control functions") MS1, demodulates the program data of the selected broadcasting station, and outputs and displays this on a monitor 8 serving as the display means.

(2) Configuration of IRD

Figure 2:
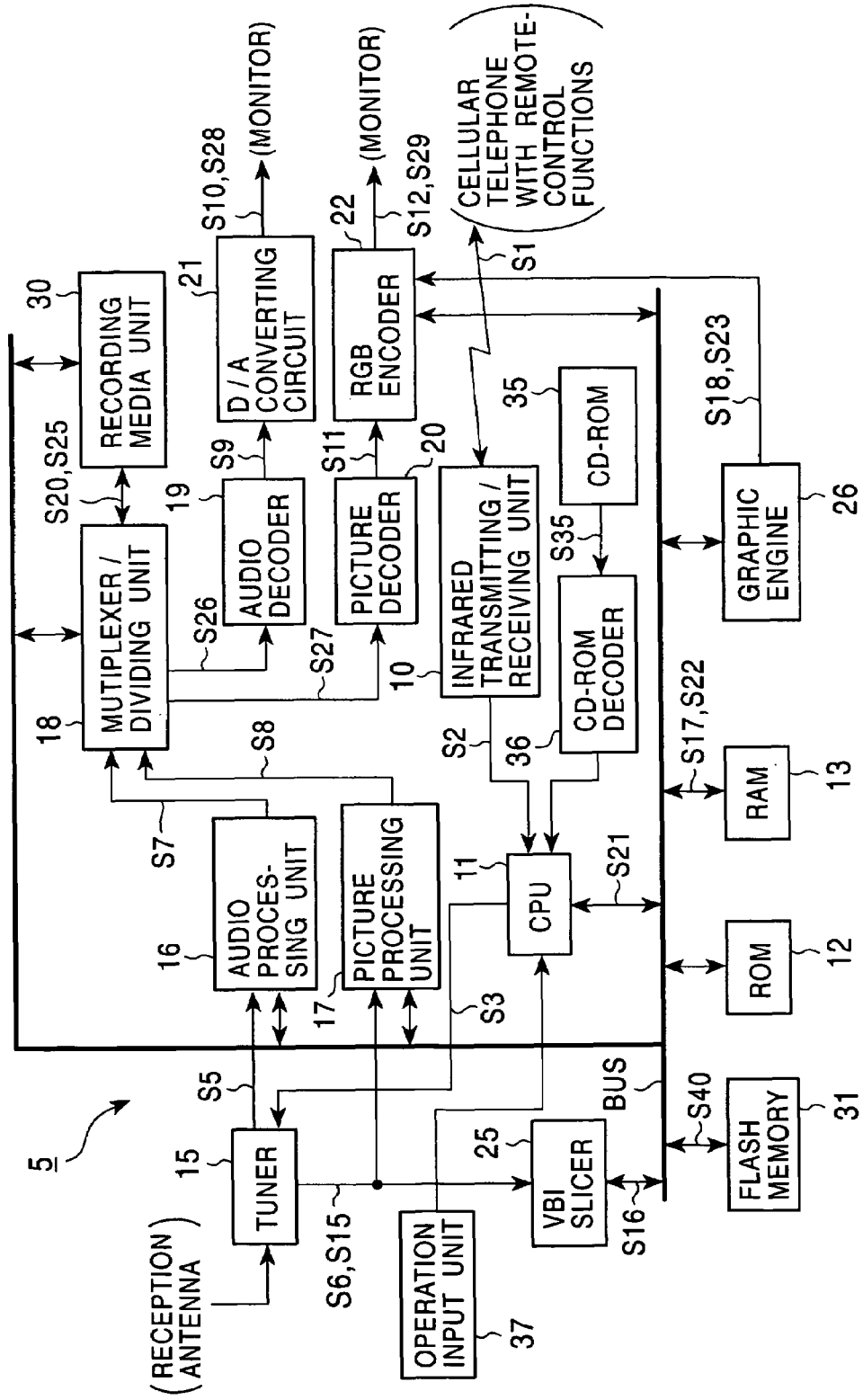
FIG. 2 is a block diagram illustrating an embodiment of an information receiving device according to the present invention.

As shown in FIG. 2, the IRD 5 receives command signals S1 superimposed on infrared rays and transmitted from the cellular telephone with remote-control functions MS1 (FIG. 1) with the infrared transmitting/receiving unit 10, the command signals S1 are converted into electric signals to generate command signals S2, following which this is sent to the CPU (Central Processing Unit) 11.

The CPU 11 reads out control programs stored in ROM (Read Only Memory) 12 as necessary, and transfers the read control programs to RAM (Random Access Memory) 13 for implementation. The CPU 11 then reads out and executes the control programs from the RAM 13, thereby controlling the circuits of the IRD 5.

The CPU 11 analyzes the command signals S2 sent from the infrared transmitting/receiving unit 10, and in the event that the results of the analysis lead to judgement that the viewer has performed station selection with the cellular telephone with remote-control functions MS1 (FIG. 1), a channel selection signal S3 according to the station selection operation is generated, and sent to the tuner 15.

The tuner 15 extracts broadcast waves of the channel (broadcast station) according to the channel selection signal S3 from the broadcast waves received by the receiving antenna 6 (FIG. 1), demodulates the broadcast waves of the extracted channel so as to generate audio signals S5 and picture signals S6, and sends the audio signals S5 to the audio processing unit 16 while sending the picture signals S6 to the picture processing unit 17.

The audio processing unit 16 subjects the audio signals S5 to analog/digital conversion, then performs compression encoding with an encoding method based on the MPEG (Moving Pictures Experts Group) specifications, and sends the audio encoded data S7 obtained thereby to the audio decoder 19 via the multiplex/dividing unit 18. The picture processing unit 17 subjects the picture signals S6 to analog/digital conversion, then performs compression encoding by an encoding method based on MPEG specifications, and sends the picture encoded data S8 thus obtained to the picture decoder 20 via the multiplex/dividing unit 18.

The audio decoder 19 expands and decodes the audio encoded data S7, and sends the audio data S9 obtained thereby to the digital/analog (D/A) conversion circuit 21. The D/A conversion circuit 21 performs digital/analog conversion of the audio data S9, thereby restoring the audio signals S10 before input to the audio processing unit 16, which is output to the monitor 8 (FIG. 1).

The picture decoder 20 expands and decodes the picture encoded data S8, and sends the picture data S11 obtained thereby to the RGB encoder 22. The RGB encoder 22 performs conversion of the picture data S11 into NTSC (National Television System Committee) luminance signals and chromatic signals and performs digital/analog conversion thereof, thereby generating picture signals S12, which are sent to the monitor 8 (FIG. 1).

Hence, the picture of the program which the viewer has selected is displayed on the display screen 8A of the monitor 8 (FIG. 1), while the audio of the program which the viewer has selected is output from the speaker of the monitor 8.

Now, with regard to the analog ground wave broadcasting system 1, program description data called electronic program guide information (referred to as EPG (Electronic Program Guide) data) is periodically distributed from a specified broadcasting station, in order to notify viewers of the programs to be provided from each broadcasting station.

This EPG data is generated for each program, and as shown in FIG. 3, is made up of information such as individual program ID, broadcasting station No. of transmitting station, broadcasting station name of transmitting station, start time of program, duration (or ending time) of program, program title, program sub-title supplementing the program title, program description, and program genre, and serves as material for the viewers to make judgement. Note that the program ID, broadcasting station No., and program genre are represented in code data, the broadcasting station name, program title, program sub-title, and program description, are represented in text data, and the start time and duration are represented in time data.

The transmitting device 2 installed at a specific broadcasting station superimposes EPG data for one week for example upon the VBI (Vertical Blanking Interval) of the picture signals, and this is periodically transmitted daily using time frames such as late night or early morning.

In this case, the tuner 15 of the IRD 5 extracts the broadcast waves of the channel upon which the EPG data is superimposed, from the broadcast waves received by the receiving antenna 6 (FIG. 1), and the broadcast waves of the extracted channel are demodulated, thereby generating picture signals S15 which are sent to the VBI slicer 25.

The VBI slicer 25 extracts the EPG data S16 from the picture signals S15, and transfers the EPG data S16 to the RAM 13 serving as program guide information storing means via the bus BUS, where it is stored. Thus, the IRD 5 updates the EPG data S16 stored in the RAM 13 daily, and always stores the newest EPG data S16 in the RAM 13.

In this state, in the event that the viewer performs an operation with the cellular telephone with remote-control functions MS1 (FIG. 1) for displaying the EPG screen, the cellular telephone with remote-control functions MS1 transmits a command signal S1 for displaying the EPG screen to the infrared transmitting/receiving unit 10. The infrared transmitting/receiving unit 10 converts this command signal S1 into a command signal S2 formed of an electric signal, which is sent to the CPU 11.

The CPU 11, upon detecting the fact that a command signal S2 has been supplied, generates EPG screen data S17 by subjecting the EPG data S16 to graphic processing on the RAM 13, based on dictionary data such as characters and symbols stored in the ROM 12, and then sends the EPG screen data S17 to the graphic engine 26 via the bus BUS.

The graphic engine 26 generates EPG image signals S18 by converting the EPG screen data S17 into NTSC luminance signals and chromatic signals, and performs digital/analog conversion thereof, which are sent to the RGB encoder 22. The RGB encoder 22 mixes the image signals 512 and EPG image signals S18 and outputs these to the monitor 8 (FIG. 1), thereby displaying an EPG screen according to the EPG image signals S18 on the display screen 8A of the monitor 8.

Now, in the event that the viewer performs an operation with the cellular telephone with remote-control functions MS1 (FIG. 1) for recording the picture and audio of a program, the cellular telephone with remote-control functions MS1 transmits a command signal S1 for performing a recording action to the infrared transmitting/receiving unit 10. The infrared transmitting/receiving unit 10 converts this command signal S1 into a command signal S2 formed of an electric signal, which is sent to the CPU 11.

The CPU 11, upon detecting the fact that a command signal S2 has been supplied, controls the actions of the circuits via the bus BUS such that the picture and audio of the program specified with the cellular telephone with remote-control functions MS1 (FIG. 1) are recorded. At this time, the multiplex/dividing unit 18 multiplexes the audio encoded data S7 sequentially obtained via the tuner 15 and audio processing unit 16, and the picture encoded data S8 sequentially obtained via the tuner 15 and picture processing unit 17, thereby generating multiplex data S20, which is transferred to the recording media unit 30 and recorded in a recording medium (not shown) built into the recording media unit 30.

Here, in the event that the CPU 11 judges that the recording of the program specified by the viewer has been completed, the CPU 11 generates recorded title list data S21 made up of a list of titles of programs recorded in the recording media unit 30, based on the EPG data S16 stored in the RAM 13 beforehand, and this recorded title list data S21 is stored in the flash memory 31. The CPU 11 updates the recorded title list data S21 each time a program is newly recorded to the recording media unit 30, thereby constantly storing the newest recorded title list data S21 in the flash memory 31.

In this state, in the event that the viewer performs an operation with the cellular telephone with remote-control functions MS1 (FIG. 1) for displaying the recorded title list screen, the cellular telephone with remote-control functions MS1 transmits a command signal S1 for displaying the recorded title list screen to the infrared transmitting/receiving unit 10. The infrared transmitting/receiving unit 10 converts this command signal S1 into a command signal S2 formed of an electric signal, which is sent to the CPU 11.

The CPU 11, upon detecting the fact that a command signal S2 has been supplied, transfers the recorded title list data S21 to the RAM 13, generates recorded title list screen data S22 by subjecting the recorded title list data S21 to graphic processing on the RAM 13, based on dictionary data such as characters and symbols stored in the ROM 12, and then sends the recorded title list screen data S22 to the graphic engine 26 via the bus BUS.

The graphic engine 26 generates recorded title list image signals S23 by converting the recorded title list screen data S22 into NTSC luminance signals and chromatic signals, and performs digital/analog conversion thereof, which are sent to the RGB encoder 22. The RGB encoder 22 mixes the image signals S12 and recorded title list image signals S23 and outputs these to the monitor 8 (FIG. 1), thereby displaying a recorded title list screen according to the recorded title list image signals S23 on the display screen 8A of the monitor 8.

Now, in the event that the viewer performs an operation with the cellular telephone with remote-control functions MS1 (FIG. 1) for reproducing the picture and audio of a desired program while viewing the recorded title list screen displayed on the display screen 8A of the monitor 8, the cellular telephone with remote-control functions MS1 transmits a command signal S1 for performing a reproducing action to the infrared transmitting/receiving unit 10. The infrared transmitting/receiving unit 10 converts this command signal S1 into a command signal S2 formed of an electric signal, which is sent to the CPU 11.

The CPU 11, upon detecting the fact that a command signal S2 has been supplied, controls the actions of the circuits via the bus BUS such that the picture and audio of the program specified with the cellular telephone with remote-control functions MS1 (FIG. 1) are reproduced. That is, the recording media unit 30 reads out the multiplex data S25 of the program specified from the multiplex data of the multiple programs recorded in the built-in recording medium (not shown), and sends this to the multiplex/dividing unit 18.

The multiplex/dividing unit 18 divides the multiplex data S25 into audio encoded data S26 and picture encoded data S27, and of these the audio encoded data S26 is sequentially passed through the audio decoder 19 and D/A converting circuit 21 so as to generate audio signals S28, which are output to the monitor 8 (FIG. 1), and the picture encoded data S27 is sequentially passed through the picture decoder 20 and RGB encoder 22 so as to generate picture signals S29, which are sent to the monitor 8.

Incidentally, the CD-ROM (Compact Disk-Read Only Memory) 35 has stored therein program logos for major programs and face photo icons made up of face photos of personalities performing in the major programs, and once the CD-ROM 35 is set in the CD-ROM decoder 36 the CD-ROM decoder 36 reads out from the CD-ROM 35 the program logo and face photo icon data as program recognition data S35 with which the viewer associates the program, and transfers and stores this in the flash memory 31 via the CPU 11. Also, the operating input unit 37 is for performing various types of setting operations, and notifies the set operation information to the CPU 11.

(3) User Registration Processing Procedures

Now, in the case of this embodiment, in the event that there are multiple users using the IRD 5, each user is provided with a personal cellular telephone MS. In this case, each user performs remote operation of the IRD 5 using his/her own cellular telephone MS via the cellular telephone with remote-control functions MS1, thereby allowing one IRD 5 to be shared, and also allowing the IRD 5 to be remote-operated from locations away from home.

Each cellular telephone MS has an individual telephone No. appropriated thereto as unique identification information, and in the event that the telephone No. of the cellular telephones MS are input via the operating input unit 37, the CPU 11 of the IRD 5 stores and registers the telephone No. of the input cellular telephones MS in the flash memory 31.

Accordingly, in an arrangement wherein the cellular telephone with remote-control functions MS1 transmits command information sent from a cellular telephone MS with the telephone No. thereof attached as a command signal S1, the IRD 5 can specify the cellular telephone Ms which issued the command information, i.e., the user, based on the telephone Nos. of the cellular telephones MS-stored in the flash memory 31.

Now, with the present embodiment, the IRD 5 stores and records broadcast program preference information of each user (hereafter referred to as "program preference information") beforehand in the flash memory 31 serving as preference information storing means. That is to say, in the event that a user operates the user registration screen key of the operating input unit 37 provided to the IRD 5, the CPU 11 of the IRD 5 generates user registration screen data on the RAM 13 based on the control program being implemented in the RAM 13, and displays a predetermined user registration screen based on the user registration screen data thus generated on the display screen 8A of the monitor 8.

Then, as the user following the guidance of the user registration screen to sequentially inputs program preference information made up of information such as channels and genres and the like preferred by each user, via the operating input unit 37, the CPU 11 stores and registers in the flash memory 31 the program preference information of each user in a manner correlated with the telephone No. of the cellular telephone MS which each user uses.

(4) Configuration of the Cellular Telephone System

Figure 4:
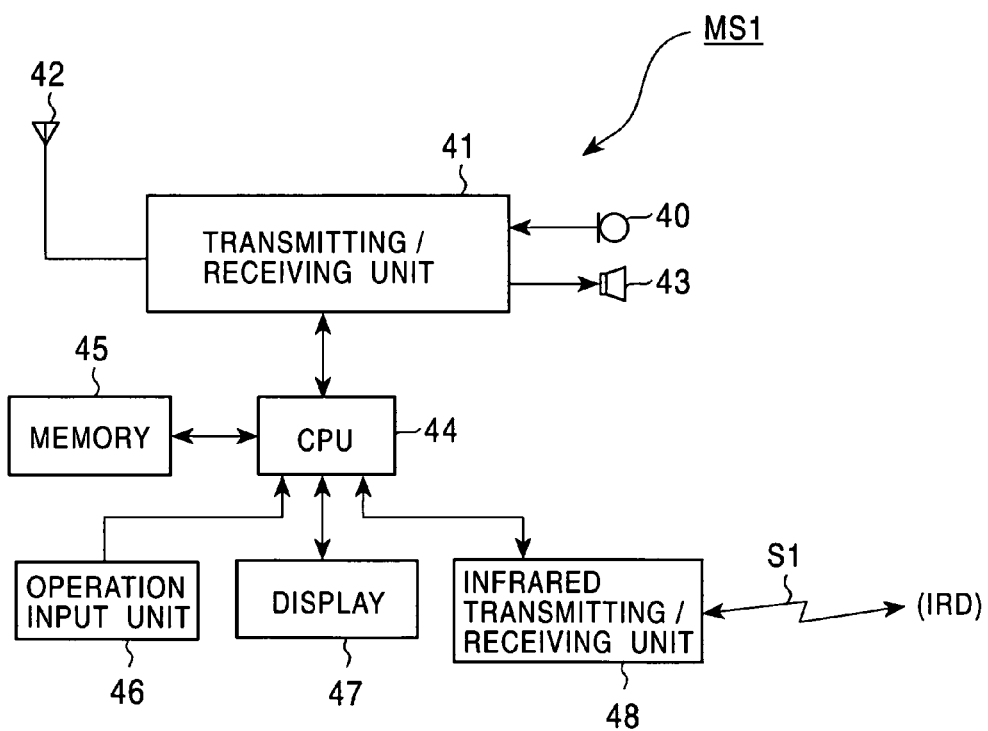
FIG. 4 is a block diagram illustrating the configuration of a cellular telephone with remote-control functions.

The cellular telephone with remote-control functions MS1 is positioned at a predetermined position in the home of the viewer, so that infrared exchange can be made with the IRD 5. FIG. 4 illustrates the configuration of the cellular telephone with remote-control functions MS1. The cellular telephone with remote-control functions MS1 inputs audio signals of the user input from the microphone 40 into a transmitting/receiving circuit unit 41. The transmitting/receiving circuit unit 41 sequentially executes processing on these audio signals such as digitizing processing, compression encoding processing, and modulating processing, so as to generate transmission signals, which are transmitted via the antenna 42.

On the other hand, at the time of receiving, the cellular telephone with remote-control functions MS1 inputs reception signals received by the antenna 42 to the transmitting/receiving circuit unit 41. The transmitting/receiving circuit unit 41 sequentially executes processing on these received signals such as expansion decoding processing, demodulating processing, and analog processing, so as to restore the audio signals, which are output from the speaker 43. Thus, the user can hear the voice of the other party via the speaker 43.

The CPU 44 reads the control programs stored in the memory 45 as necessary, and controls the actions of the circuits by executing the control programs which have been read out. Also, the CPU 44 controls the actions of the circuits based on operating information input via the operating input unit 46, and displays predetermined information on the display 47, according to necessity.

The infrared transmitting/receiving unit 48 superimposes command signals S1 being supplied from the CPU 44 onto infrared rays which are transmitted to the IRD 5, and also receives transmission signals being transmitted from the IRD 5 superimposed on infrared rays, and converts the received reception signals into electric signals which are sent to the CPU 44.

As shown in FIG. 1, the cellular telephone with remote-control functions MS1 exists within a cell C1 formed by dividing an area to which communication service by the cellular telephone system is provided into desired sizes, such that the cellular telephone with remote-control functions MS1 performs wireless communication with a base station BS1 installed within the cell C1. The base station BS1 is connected to a mobile communication control station 50 of a higher order, and the mobile communication control station 50 stores in home memory 51 the position information indicating that the cellular telephone with remote-control functions MS1 exists within the cell C1, based on the signals being sent from the base station BS1.

Now, let us say that in this state, the user takes his/her own cellular telephone MS2 out of the home, and moves into a cell C2 where a base station BS2, for example, is. In this case, the cellular telephone MS2 performs wireless communication with the base station BS2 within the cell C2, and the mobile communication control station 50 stores in home memory 51 the position information indicating that the cellular telephone MS2 exists within the cell C2, based on the signals being sent from the base station BS2.

Figure 5:
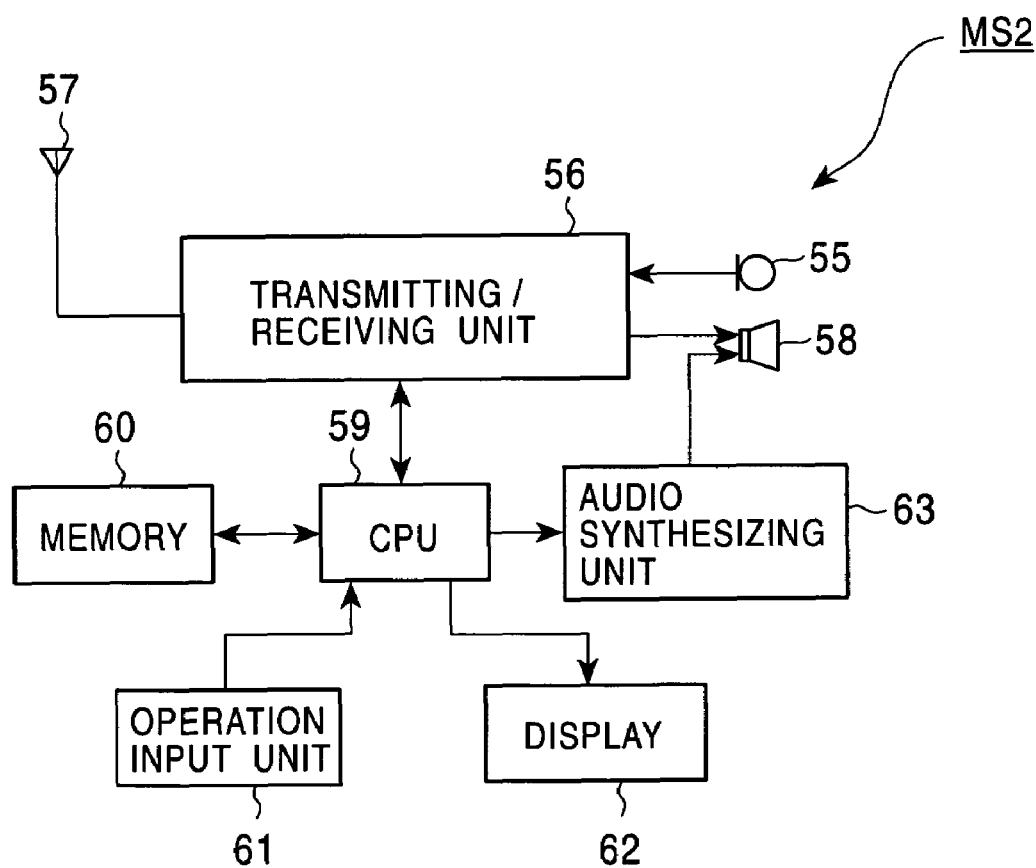
FIG. 5 is a block diagram illustrating the configuration of a cellular telephone.

FIG. 5 illustrates the configuration of the cellular telephone MS2. The cellular telephone MS2 inputs audio signals of the user input from the microphone 55 into a transmitting/receiving circuit unit 56. The transmitting/receiving circuit unit 56 sequentially executes processing on these audio signals such as digitizing processing, compression encoding processing, and modulating processing, so as to generate transmission signals, which are transmitted via the antenna 57.

On the other hand, at the time of receiving, the cellular telephone MS2 inputs reception signals received by the antenna 57 to the transmitting/receiving circuit unit 56. The transmitting/receiving circuit unit 56 sequentially executes processing on these received signals such as expansion decoding processing, demodulating processing, and analog processing, so as to restore the audio signals, which are output from the speaker 58. Thus, the user can hear the voice of the other party via the speaker 58.

The CPU 59 reads the control programs stored in the memory 60 as necessary, and controls the actions of the circuits by executing the control programs which have been read out. Also, the CPU 59 controls the actions of the circuits based on operating information input via the operating input unit 61, and displays predetermined information on the display 62, according to necessity. The audio synthesizing unit 63 generates audio signals based on the instructions of the CPU 59, which are output from the speaker 58, thereby communicating the desired information to the user.

(5) Program Reservation Settings Processing Procedures

Figure 6:
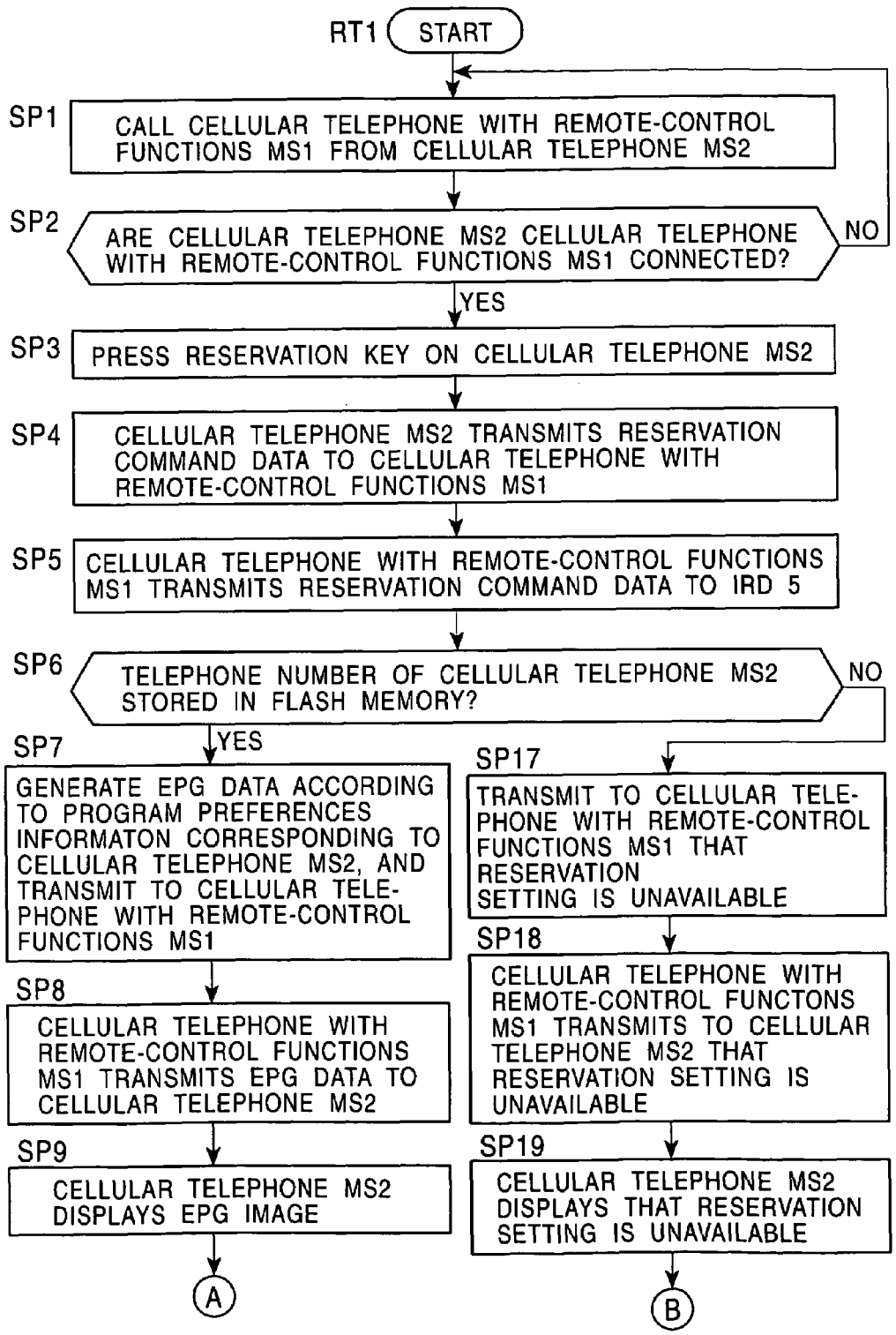
FIG. 6 is a flowchart illustrating the program reservation setting process procedures in the case of obtaining EPG data from an IRD.
Figure 7:
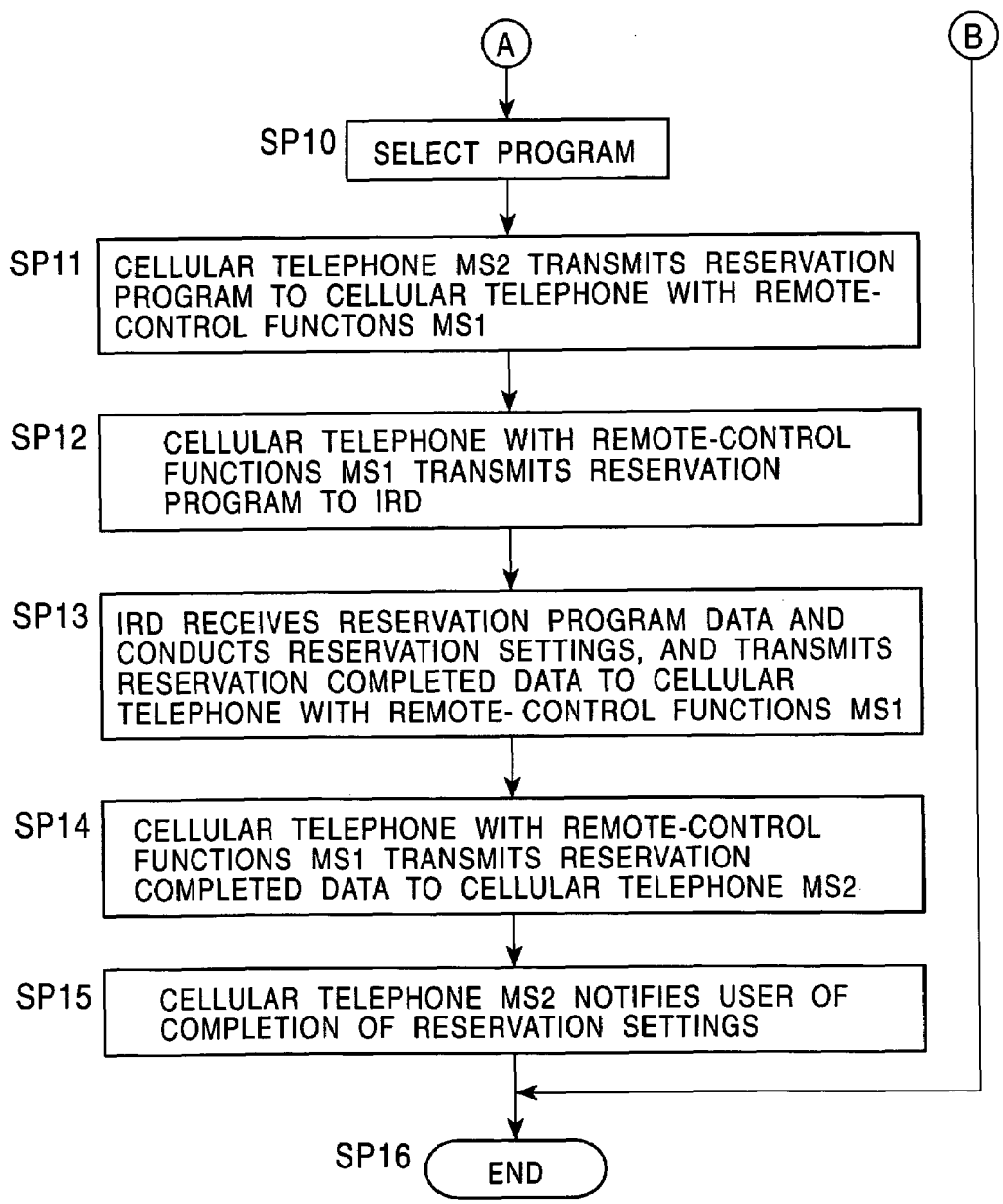
FIG. 7 is another flowchart illustrating the program reservation setting process procedures in the case of obtaining EPG data from an IRD.

As shown in FIG. 1, in the event that the cellular telephone MS2 exists in the cell C2, the user operating the call key of the operating input unit 61 and inputting the telephone No. of the cellular telephone with remote-control functions MS1 causes the CPU 59 of the cellular telephone MS2 to execute the program reservation settings processing procedures RT1 for obtaining EPG data from the IRD 5, as shown in FIG. 6 and FIG. 7.

That is, once the CPU 59 of the cellular telephone MS2 enters into the program reservation settings processing procedures RT1 for obtaining EPG data from the IRD 5, as in FIG. 6 and FIG. 7, the flow proceeds to step SP1, the action of the transmitting/receiving circuit unit 56 is controlled so as to call the cellular telephone with remote-control functions MS1. In the subsequent step SP2, judgement is made regarding whether or not the cellular telephone with remote-control functions MS1 and the cellular telephone MS2 have been connected by a line, and the processing steps SP1 and SP2 are sequentially repeated until positive results are obtained.

In the event that positive results are obtained for step SP2, this means that the cellular telephone with remote-control functions MS1 and the cellular telephone MS2 have been connected by a line, so in this case the CPU 59 of the cellular telephone MS2 proceeds to step SP3, and in the event that the reservation key of the operating input unit 61 is pressed, this is detected and the flow proceeds to step SP4, where the reservation command data corresponding to the pressed reservation key are read out from the memory 60, and the read reservation command data is transmitted to the cellular telephone with remote-control functions MS1 via the transmitting/receiving circuit unit 56 and antenna 57 in sequence.

Then, in the subsequent step SP5, the cellular telephone with remote-control functions MS1 receives the reservation command data sent from the cellular telephone MS2, and transmits the received reservation command data with the telephone No. of the cellular telephone MS2 attached thereto as command signal S1 to the IRD 5, by superimposing on infrared rays. In the subsequent step SP6, the CPU 11 of the IRD 5 analyses the command signal S1 received by the infrared transmitting/receiving unit 10, and judgement is made whether or not the telephone No. of the cellular telephone MS2 indicated by the analysis results thereof is stored in the flash memory 31.

In the event that positive results are obtained in step SP6, this means that the telephone No. of the cellular telephone MS2 is stored in the flash memory 31, so in this case the CPU 11 of the IRD 5 proceeds to the subsequent step SP7 and acts as searching means to read out the program preference information which corresponds to the telephone No. of the cellular telephone MS2 from the flash memory 31. Then, the CPU 11 of the IRD 5 searches programs matching the preferences of the user from the EPG data S16 stored in the RAM 13 based on this program preference information, generates EPG data from the searched programs, and transmits the generated EPG data from the infrared transmitting/receiving unit 10 to the cellular telephone with remote-control functions MS1.

In the subsequent step SP8, the cellular telephone with remote-control functions MS1 receives the EPG data being sent from the IRD 5, and transmits the received EPG data to the cellular telephone MS2. Then, in step SP9, the cellular telephone MS2 receives the EPG data sent from the cellular telephone with remote-control functions MS1 with the antenna 57, and sends this to the CPU 59 via the antenna 57 and transmitting/receiving circuit unit 56 in sequence. The CPU 59 of the cellular telephone MS2 stores this EPG data in the memory 60, and displays the EPG screen corresponding to the EPG data on the display 62 serving as the notifying means.

In this state, in the event that the user presses the audio guide key of the operating input unit 61, the CPU 59 reads out the EPG data from the memory 60, and supplies this to the audio synthesizing unit 63. The audio synthesizing unit 63 generates audio signals based on this EPG data, and outputs the audio signals from the speaker 58 serving as the notifying means, thereby audibly notifying the user of the information corresponding to the EPG screen.

Then, in step SP10, in the event that the desired program is selected from the multiple programs displayed on the EPG screen, the CPU 59 of the cellular telephone MS2 proceeds to the subsequent step SP11, and transmits the date and time of broadcast of the selected program, the channel thereof, program title, and so forth, as reservation program data, to the cellular telephone with remote-control functions MS1.

In the subsequent step SP12, the cellular telephone with remote-control functions MS1 receives the reservation program data sent from the cellular telephone MS2, and transmits the received reservation program data to the IRD 5. In step SP13, the IRD 5 receives this reservation program data with the infrared transmitting/receiving unit 10, and following storing the received reservation program data to the flash memory 31 and performing the reservation settings, transmits reservation completed data indicating that the reservation settings have been completed from the infrared transmitting/receiving unit 10 to the cellular telephone with remote-control functions MS1.

In step SP14, the cellular telephone with remote-control functions MS1 receives the reservation completed data being sent from the IRD 5, and transmits the received reservation completed data to the cellular telephone MS2. In the subsequent step SP15, the cellular telephone MS2 receives the reservation completed data with the antenna 57, and sends this to the CPU 59 via the antenna 57 and transmitting/receiving circuit unit 56 in sequence. The CPU 59 of the cellular telephone MS2 generates message information corresponding to the reservation completed data, and displays this on the display 62, thereby notifying the user that reservation has been completed.

In this state, in the event that the user presses the audio guide key of the operating input unit 61, the cellular telephone MS2 makes audio output from the speaker 58 that the reservation has been completed. Then, the CPU 59 of the cellular telephone MS2 completes the processing procedures in step SP16.

On the other hand, in the event that negative results are obtained in step SP6, this means that the telephone No. of the cellular telephone MS2 is not stored in the flash memory 31 of the IRD 5, so in this case the CPU 11 of the IRD 5 proceeds to step SP17, generates reservation unavailable data indicating that reservation setting is not available in this case, which is transmitted from the infrared transmitting/receiving unit 10 to the cellular telephone with remote-control functions MS1.

In the subsequent step SP18, the cellular telephone with remote-control functions MS1 receives the reservation unavailable data being sent from the IRD 5, and transmits the received reservation unavailable data to the cellular telephone MS2. In the subsequent step SP19, the cellular telephone MS2 receives the reservation unavailable data sent from the cellular telephone with remote-control functions MS1 with the antenna 57, and sends this to the CPU 59 via the antenna 57 and transmitting/receiving circuit unit 56 in sequence. The CPU 59 generates message information corresponding to this reservation unavailable data and displays it on the display 62, thereby notifying the user that reservation is not available.

In this state, in the event that the user presses the audio guide key of the operating input unit 61, the cellular telephone MS2 audibly outputs from the speaker 58 that reservation is not available. Then, the CPU 59 of the cellular telephone MS2 completes the processing procedures in step SP16.

Subsequently, the CPU 11 of the IRD 5 acts as recording control means to execute recording actions based on the reservation program data stored in the flash memory 31, and records the program regarding which reservation settings have been made in the above program reservation settings processing procedures RT1 with the recording medium unit 30. At this time, the CPU 11 of the IRD 5 generates recording title list data S21 for the user using the cellular telephone MS2 in accordance with the telephone No. of the cellular telephone MS2, based on the EPG data S16 stored beforehand in the RAM 13, and stores this in the flash memory 31.

Then, once the user performs operations to display the recorded title list screen on the cellular telephone MS2, the CPU 11 of the IRD 5 reads the recording title list data S21 from the flash memory 31, transmits the read recording title list data S21 to the cellular telephone MS2 via the cellular telephone with remote-control functions MS1, and displays the recording title list screen corresponding to the recording title list data S21 on the display 62 of the cellular telephone MS2.

(6) Operations and Advantages of the Present Embodiment

In the above-described configuration, the IRD 5 correlates the program preference information of each user with the telephone No. of the cellular telephone MS used by each user, and stores each of these in the flash memory 31.

In this state, in the event that a user uses a cellular telephone MS2 from out of the home to perform an EPG screen display operation, the CPU 11 of the IRD 5 reads the program preference information corresponding to the telephone No. of the cellular telephone MS2 sent from the cellular telephone MS2 via the cellular telephone with remote-control functions MS1 from the flash memory 31, and EPG data matching the preferences of the user using the cellular telephone MS2 is generated based on the read program preference information.

Then, the CPU 11 of the IRD 5 transmits this generated EPG data to the cellular telephone MS2 via the cellular telephone with remote-control functions MS1, and an EPG screen corresponding to the transmitted EPG data is displayed on the display 62 of the cellular telephone MS2.

Thus, even in the event that the user is out of the home with the cellular telephone MS2, all the user needs to do is to operate the cellular telephone MS2 from the remote location, and programs matching the preference of the user can be searched from the immense number of programs contained in the EPG data S16 stored in the IRD 5 and displayed on the display 62 of the cellular telephone MS2. Accordingly, each user can use the IRD 5 as if it were his/her personal IRD.

Also, displaying only the programs recorded by the user on the display 62 of the cellular telephone MS2 out of the programs that have been recorded on the recording medium unit 30 as a recorded title list screen facilitates ease of managing the programs, even in the event that the number of programs recorded on the recording medium unit 30 increases. At this time, the user can only display his/her recorded title list screen on the display 62, so erroneous operations wherein the user erases programs recorded by other users can be prevented.

According to the above configuration, program preference information for each of multiple users is registered beforehand to the IRD 5 for each telephone No. of the cellular telephones MS used by each user, and in the event that a given user of the multiple users performs a program list display operation with his/her own cellular telephone MS, a list of programs matching the preferences of the user using the cellular telephone MS is generated based on the program preference information corresponding to the telephone No. transmitted from the cellular telephone MS via the cellular telephone with remote-control functions MS1, and this is transmitted to the cellular telephone MS, thereby allowing a program list matching the preferences of the user to be provided to the user, regardless of where the user using the cellular telephone MS is located.

(7) Other Embodiments

Now, in the above-described embodiment, an arrangement wherein the cellular telephone MS2 obtains EPG data from the IRD 5 was described, but the present invention is by no means restricted to such; rather, an arrangement may be made wherein EPG data is obtained from other various types of information providing apparatus such as an EPG server 71 connected to the mobile communication control station 50 via the Internet 70, as shown in FIG. 1. In the event of obtaining EPG data from the EPG server 71, there is no need for the IRD 5 to store EPG data S16 in the RAM 13 of the IRD 5, so the memory capacity of the RAM 13 can be conserved.

In this case, the user registers his/her own program preference information in a manner correlated with the user ID serving as identification information, to the database unit (not shown) of the EPG server 71 beforehand.

Figure 8:
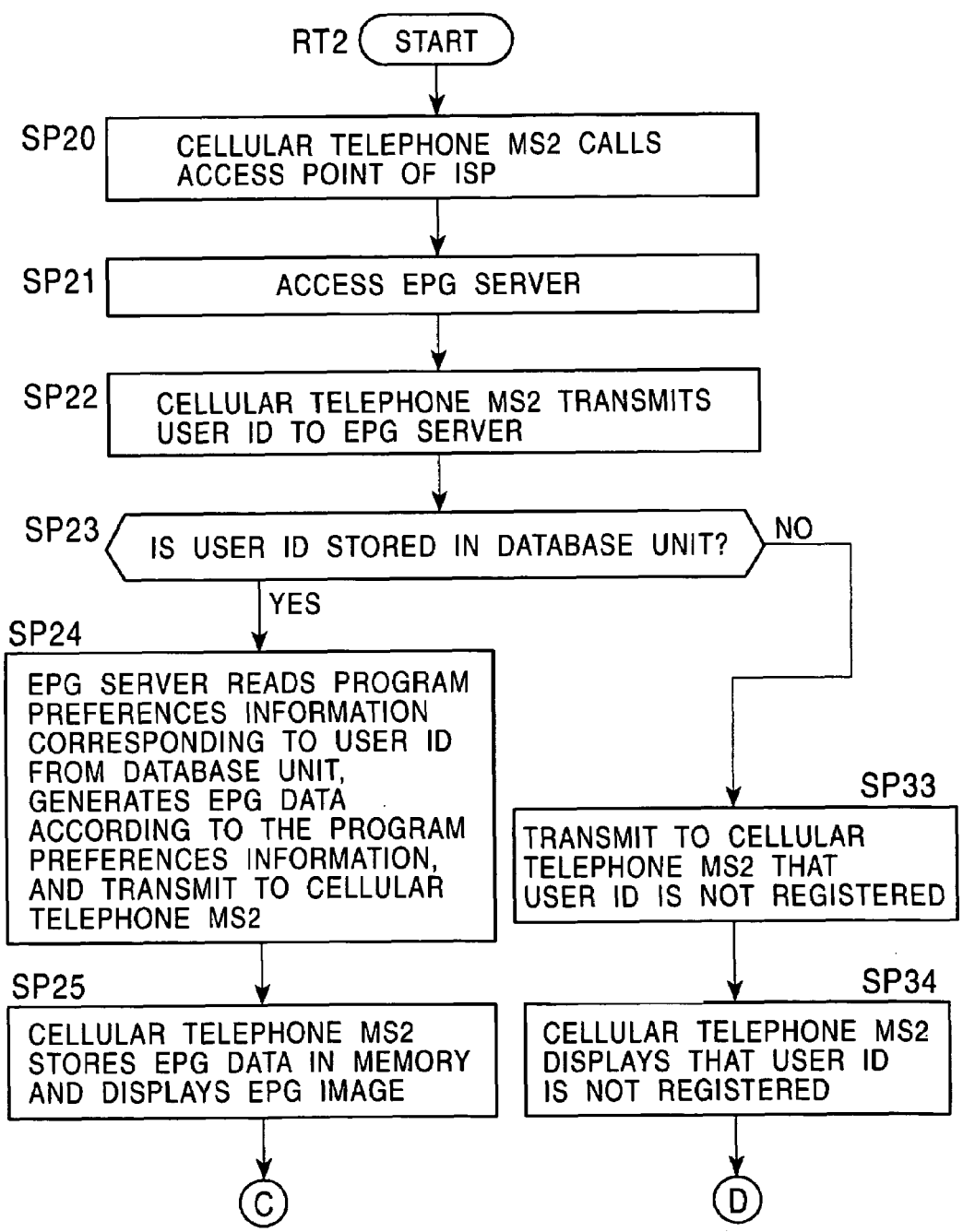
FIG. 8 is a flowchart illustrating the program reservation setting process procedures in the case of obtaining EPG data from an EPG server.

Then, in the event that the user of the cellular telephone MS2 operates the call key of the operating input unit 61 and inputs the telephone No. of the access point of the ISP, the CPU 59 of the cellular telephone MS2 executes a program reservation setting processing procedure RT2 for obtaining EPG data from the EPG server 71, as shown in FIGS. 8 and 9.

That is, as shown in FIGS. 8 and 9, once the flow enters the program reservation setting processing procedure RT2 for obtaining EPG data from the EPG server 71, the CPU 59 of the cellular telephone MS2 proceeds to step SP20, calls the access point of the ISP by controlling the action of the transmitting/receiving circuit unit 56, and in the subsequent step SP21 accesses the EPG server 71.

Then, in the event that the user inputs the user ID via the operating input unit 61, the CPU 59 of the cellular telephone MS2 in step SP22 transmits the input user ID to the EPG server 71 via the transmitting/receiving circuit unit 56 and antenna 57 in sequence. In step SP23, the EPG server 71 receives the user ID sent from the cellular telephone MS2, and judges whether or not the received user ID is registered in the database unit.

In the event that positive results are obtained for step SP23, this means that the user ID of the user using the cellular telephone MS2 has been registered in the database unit, and at this time the EPG server 71 proceeds to the subsequent step SP24, reads the program preference information corresponding to the user ID from the database unit, generates EPG data matching the preferences of the user based on the read program preference information, and transmits this to the cellular telephone MS2.

In step SP25, the cellular telephone MS2 receives the EPG data sent from the EPG server 71 with the antenna 57, and sends this to the CPU 59 via the antenna 57 and transmitting/receiving circuit unit 56 in sequence. The CPU 59 of the cellular telephone MS2 stores this EPG data in the memory 60, and also displays on the display 62 an EPG screen corresponding to the EPG data.

In this state, in the event that the user presses the audio guide key of the operating input unit 61, the CPU 59 reads out the EPG data from the memory 60, and supplies this to the audio synthesizing unit 63. The audio synthesizing unit 63 generates audio signals based on this EPG data, and outputs the audio signals from the speaker 58, thereby audibly notifying the user of the information corresponding to the EPG screen.

Then, in step SP26, in the event that the desired program is selected from the multiple programs displayed on the EPG screen, the CPU 59 of the cellular telephone MS2 proceeds to the subsequent step SP27, and transmits the date and time of broadcast of the selected program, the channel thereof, program title, and so forth, as reservation program data, to the cellular telephone with remote-control functions MS1.

In the subsequent step SP28, the cellular telephone with remote-control functions MS1 receives the reservation program data sent from the cellular telephone MS2, and transmits the received reservation program data to the IRD 5. In step SP29, the IRD 5 receives this reservation program data with the infrared transmitting/receiving unit 10, and following storing the received reservation program data to the flash memory 31 and performing the reservation settings, transmits reservation completed data indicating that the reservation settings have been completed from the infrared transmitting/receiving unit 10 to the cellular telephone with remote-control functions MS1.

In step SP30, the cellular telephone with remote-control functions MS1 receives the reservation completed data being sent from the IRD 5, and transmits the received reservation completed data to the cellular telephone MS2. In the subsequent step SP31, the cellular telephone MS2 receives the reservation completed data with the antenna 57, and sends this to the CPU 59 via the antenna 57 and transmitting/receiving circuit unit 56 in sequence. The CPU 59 generates message information corresponding to the reservation completed data, and displays this on the display 62, thereby notifying the user that reservation has been completed.

In this state, in the event that the user presses the audio guide key of the operating input unit 61, the cellular telephone MS2 makes audio output from the speaker 58 that the reservation has been completed. Then, the CPU 59 of the cellular telephone MS2 completes the processing procedures in step SP32.

On the other hand, in the event that negative results are obtained in step SP23, this means that the user ID of the user using the cellular telephone MS2 is not registered in the database unit, so in this case the EPG server 71 proceeds to step SP33 and generates unregistered data indicating that the user ID has not yet been registered, which is transmitted to the cellular telephone MS2.

In step SP34, the cellular telephone MS2 receives the unregistered data being sent from the EPG server 71 with the antenna 57, and sends the unregistered data to the CPU 59 via the antenna 57 and transmitting/receiving circuit unit 56 in sequence. The CPU 59 generates message information corresponding to this unregistered data and displays it on the display 62, thereby notifying the user that the input user ID is unregistered.

In this state, in the event that the user presses the audio guide key of the operating input unit 61, the cellular telephone MS2 audibly outputs from the speaker 63 that the input user ID is unregistered. Then, the CPU 59 of the cellular telephone MS2 completes the processing procedures in step SP32.

Also, though the above embodiments have been described as a case wherein setting operation of the registration recording is performed from the cellular telephone MS2, the present invention is not restricted to such; rather, various setting operations such as power on/off, switching channels, replay, etc., may be performed.

Also, though the above embodiments have been described with reference to a case wherein the EPG screen is displayed on the display 62 of a cellular telephone MS2, the present invention is not restricted to such; rather, the display of the EPG screen may be made on the display screen 8A of a monitor 8.

Also, though the above embodiments have been described with reference to a case wherein the IRD 5 is operated from a cellular telephone MS2 via a cellular telephone with remote-control functions MS1, the present invention is not restricted to such; rather, an arrangement may be made wherein the IRD 5 is operated with other various remote commanders connected to predetermined communicating means such as a fixed telephone connected to a public telephone line for example, as long as the arrangement has functions for exchanging with infrared.

Also, though the above embodiments have been described with reference to a case wherein the cellular telephone with remote-control functions MS1 and the IRD 5 are connected with infrared, the present invention is not restricted to such; rather, an arrangement may be made wherein the connection is a line connection using Ethernet, for example.

Also, though the above embodiments have been described with reference to a case wherein the telephone No. of the cellular telephone MS2 is transmitted each time command signals S1 are transmitted from the cellular telephone with remote-control functions MS1 to the IRD 5, the present invention is not restricted to such; rather, an arrangement may be made wherein the telephone No. of the cellular telephone MS2 is transmitted at the time of turning on the power of the IRD 5 so as to register this telephone No. in the IRD 5, and cancel the registration at the point of turning off the power or completing registration settings.

Also, though the above embodiments have been described with reference to a case wherein EPG data indicating the contents of programs provided from broadcasting stations is provided from an IRD 5 to a cellular telephone MS2, the present invention is not restricted to such; rather, program guide information indicating the contents of other various programs may be provided from a program guide information providing device to a cellular telephone MS.

Also, though the above embodiments have been described with reference to a case wherein the cellular telephone MS2 is used as a communication terminal device, the present invention is not restricted to such; rather, other various communication terminal devices may be widely applied.

Further, though the above embodiments according to the present invention have been described with reference to an arrangement wherein information received by an IRD 5 of a analog ground wave broadcasting system 1 is displayed, the present invention is not restricted to such; rather, the present invention may be widely applied to cases such as displaying information distributed by digital satellite broadcast or cable broadcast.

As described above, the present invention stores beforehand in program guide information storing means program guide information indicating the contents of programs to be supplied by predetermined program supplying means;

correlates preference information indicating the preferences of user using the communication terminal device with identification information appropriated to the communication terminal device, and stores the preference information beforehand in preference information storing means;

reads from the preference information storing means the preference information corresponding to the identification information transmitted from the communication terminal device;

searches programs matching the preferences of the user from the program guide information based on the read preference information;

generates searched program guide information comprising the searched programs; and transmits the searched program guide information to the communication terminal device;

thereby allowing the user to be provided with program guide information matching the preferences of the user, regardless of the location of the user using the communication terminal device.

What is claimed is:

1. A program guide information providing device that communicates with a communication terminal device; said program guide information providing device comprising:
   program guide information storing means for storing program guide information indicating contents of programs to be supplied by predetermined program supplying means;
   preference information storing means for storing preference information indicating preferences of each of one or more users,
   wherein the preference information comprises information linking:
      each of the one or more users;
      a corresponding personal remote terminal device having a user operable input selector; and
      program information preferred by each of the users,
   wherein the personal remote terminal device is a cellular telephone communicates with the program guide information providing device via one of a plurality of communication terminal devices as a function of a cell area that the personal remote terminal device is located in, and generates a user registration screen as a function of pre-registered preference information, guides the one or more users to sequentially input program preference information, receives the program information preferred by the associated user, correlates the program preference information with an associated cellular telephone number, displays the program information, selects a program from the program guide information in response to user operation of said input selector, and displays audio and visual data of the selected program,
   wherein the personal remote terminal device can be used at any of a plurality of program guide information providing devices, and
   wherein the personal remote terminal device can be operated at a remote location from any of the plurality of program information providing devices,
   wherein the preference information is stored in a manner correlated with a telephone number of the personal remote terminal device of each of the one or more users;
   a receiver for receiving identification information from said communication terminal device indicative of the identification thereof,
   wherein the receiver is positioned in a predetermined position in the home allowing an information exchange with the communication terminal device via infrared and an information exchange with each of the plurality of personal remote terminal devices,
   wherein, when the personal remote terminal device is unable to communicate with the program guide information providing device, the personal remote terminal device communicates with a second personal remote terminal device which is able to communicate with the program guide information providing device and relay the information between the program guide information providing device and the personal remote terminal device;
   searching means for:
      reading from said preference information storing means said preference information corresponding to said identification information transmitted from said communication terminal device,
      searching programs matching the preferences of said user from said program guide information based on said read preference information, and
      generating searched program guide information comprising said searched programs; and
   transmitting means for transmitting said searched program guide information to said communication terminal device;
   wherein a program selection apparatus receives program selection information upon selection of one of said programs listed in said program guide information, a list of programs in said program guide is previously created and stored by said user and said previously created and stored list of programs in said program guide is remotely accessed by said user upon request on said communication terminal device.

2. The program guide information providing device according to claim 1, further comprising receiving means for receiving programs supplied from said program supplying means.

3. The program guide information providing device according to claim 1, wherein said preference information storing means is located adjacent said program selection apparatus.

4. The program guide information providing device according to claim 1, wherein said preference information is located at a remote location apart from said program selection apparatus.

5. The program guide information providing device according to claim 4, wherein said preference information is retrieved over a public network.

6. The program guide information providing device according to claim 4, wherein said preference information is stored at a website.

7. A program guide information providing system comprising a communication terminal device and a program guide information providing device adapted to communicate with each other;
   wherein said program guide information providing device comprises:
      program guide information storing means for storing program guide information indicating the contents of programs to be supplied by predetermined program supplying means;
      preference information storing means for storing preference information indicating the preferences of each of one or more users,
   wherein the preference information comprises information linking:
   each of the one or more users;
   a corresponding personal remote terminal device having a user operable input selector; and
   program information preferred by each of the users,
   wherein the personal remote terminal device is a cellular telephone communicates with the program guide information providing device via one of a plurality of communication terminal devices as a function of a cell area that the personal remote terminal device is located in, and generates a user registration screen as a function of pre-registered preference information, guides the one or more users to sequentially input program preference information, receives the program information preferred by the associated user, correlates the program preference information with an associated cellular telephone number, displays the program information, selects a program from the program guide information in response to user operation of said input selector, and displays audio and visual data of the selected program, wherein the personal remote terminal device can be used at any of a plurality of program guide information providing devices, and wherein the personal remote terminal device can be operated at a remote location from any of the plurality of program information providing devices, wherein the preference information is stored in a manner correlated with a telephone number of the personal remote terminal device of each of the one or more users;

a receiver for receiving identification information from said communication terminal device indicative of the identification thereof, wherein the receiver is positioned in a predetermined position in the home allowing an information exchange with the communication terminal device via infrared and an information exchange with each of the plurality of personal remote terminal devices, wherein, when the personal remote terminal device is unable to communicate with the program guide information providing device, the personal remote terminal device communicates with a second personal remote terminal device which is able to communicate with the program guide information providing device and relay the information between the program guide information providing device and the personal remote terminal device;

searching means for:
reading from said preference information storing means said preference information corresponding to said received identification information,
searching programs matching the preferences of said user from said program guide information based on said read preference information, and
generating searched program guide information comprising said searched programs; and
transmitting means for transmitting said searched program guide information to said communication terminal device;

and wherein said communication terminal device comprises:
transmitting means for transmitting to said guide information providing device said identification information associated with said communication terminal device;
receiving means for receiving said searched program guide information transmitted from said program guide information providing device;
notifying means for notifying the user of said received searched program guide information; and
transmitting means for transmitting to a program selection apparatus program selection information upon selection of said program listed in said program guide information, a list of programs in said program guide is previously created and stored by said user and said previously created and stored list of programs in said program guide is remotely accessed by said user upon request on said communication terminal device.

8. The program guide information providing system according to claim 7, said program guide information providing device further comprising receiving means for receiving programs supplied from said program supplying means.

9. The program guide information providing system according to claim 7, wherein said preference information storing means is located adjacent said program selection apparatus.

10. The program guide information providing system according to claim 7, wherein said preference information is located at a remote location apart from said program selection apparatus.

11. The program guide information providing system according to claim 10, wherein said preference information is retrieved over a public network.

12. The program guide information providing system according to claim 10, wherein said preference information is stored at a website.

13. An information receiving device for communicating with a communication terminal device, said information receiving device comprising:
program guide information storing means for storing program guide information indicating the contents of programs to be supplied by predetermined program supplying means;
preference information storing means for storing preference information indicating the preferences of each of one or more users,
wherein the preference information comprises information linking:
each of the one or more users;
a corresponding personal remote terminal device having a user operable input selector; and
program information preferred by each of the users,
wherein the personal remote terminal device is a cellular telephone communicates with the information receiving device via one of a plurality of communication terminal devices as a function of a cell area that the personal remote terminal device is located in, and generates a user registration screen as a function of pre-registered preference information, guiding the one or more users to sequentially input program preference information, receives the program information preferred by the associated user, correlates the program preference information with an associated cellular telephone number, displays the program information, selects a program from the program guide information in response to user operation of said input selector, and displays audio and visual data of the selected program, wherein the personal remote terminal device can be used at any of a plurality of program guide information providing devices, and wherein the personal remote terminal device can be operated at a remote location from any of the plurality of program information providing devices, wherein the preference information is stored in a manner correlated with a telephone number of the personal remote terminal device of each of the one or more users;

a receiver for receiving identification information from said communication terminal device indicative of the identification thereof, wherein the receiver is positioned in a predetermined position in the home allowing an information exchange with the communication terminal device via infrared and an information exchange with each of the plurality of personal remote terminal devices, wherein, when the personal remote terminal device is unable to communicate with the program guide information providing device, the personal remote terminal device communicates with a second personal remote terminal device which is able to communicate with the program guide information providing device and relay the information between the program guide information providing device and the personal remote terminal device;

searching means for:
- reading from said preference information storing means said preference information corresponding to said received identification information,
- searching programs matching the preferences of said user from said program guide information based on said read preference information, and
- generating searched program guide information comprising said searched programs;
- transmitting means for transmitting said searched program guide information to a remote commander; and said remote commander having first transmitting/receiving means for directly exchanging information between said receiving means and said transmitting means, and second transmitting/receiving means for exchanging information via said communication terminal device and said communicating means;

wherein a program selection apparatus receives program selection information upon selection of one of said programs listed in said program guide information, a list of programs in said program guide is previously created and stored by said user and said previously created and stored list of programs in said program guide is remotely accessed by said user upon request on said communication terminal device.

14. The information receiving device according to claim 13, further comprising recording control means for recording to recording means programs specified by said communication terminal device from a plurality of programs supplied from said program supplying means.

15. The information receiving device according to claim 13, wherein said preference information storing means is located adjacent said program selection apparatus.

16. The information receiving device according to claim 13, wherein said preference information is located at a remote location apart from said program selection apparatus.

17. The information receiving device according to claim 16, wherein said preference information is retrieved over a public network.

18. The information receiving device according to claim 16, wherein said preference information is stored at a website.

19. A remote operating system wherein a communication terminal device and an information receiving device are for communicating with each other;

wherein said information receiving device comprises:
- program guide information storing means for storing program guide information indicating the contents of programs to be supplied by predetermined program supplying means;
- preference information storing means for storing preference information indicating the preferences of each of one or more users,
- wherein the preference information comprises information linking:
  - each of the one or more users;
  - a corresponding personal remote terminal device having a user operable input selector; and
  - program information preferred by each of the users, wherein the personal remote terminal device is a cellular telephone communicates with the information receiving device via one of a plurality of communication terminal devices as a function of a cell area that the personal remote terminal device is located in, and generates a user registration screen as a function of pre-registered preference information, guides the one or more users to sequentially input program preference information, receives the program information preferred by the associated user, correlates the program preference information with an associated cellular telephone number, displays the program information, selects a program from the program guide information in response to user operation of said input selector, and displays audio and visual data of the selected program, wherein the personal remote terminal device can be used at any of a plurality of program guide information providing devices, and wherein the personal remote terminal device can be operated at a remote location from any of the plurality of program information providing devices, wherein the preference information is stored in a manner correlated with a telephone number of the personal remote terminal device of each of the one or more users;

a receiver for receiving identification information from said communication terminal device indicative of the identification thereof, wherein the receiver is positioned in a predetermined position in the home allowing an information exchange with the communication terminal device via infrared and an information exchange with each of the plurality of personal remote terminal devices, wherein, when the personal remote terminal device is unable to communicate with the program guide information providing device, the personal remote terminal device communicates with a second personal remote terminal device which is able to communicate with the program guide information providing device and relay the information between the program guide information providing device and the personal remote terminal device;

searching means for:
- reading from said preference information storing means said preference information corresponding to said received identification information,
- searching programs matching the preferences of said user from said program guide information based on said read preference information, and
- generating searched program guide information comprising said searched programs;

transmitting means for transmitting said searched program guide information to a remote commander; and said remote commander having first transmitting/receiving means for directly exchanging information between said receiving means and said transmitting means, and second transmitting/receiving means for exchanging information via said communication terminal device and said communicating means;

and wherein said communication terminal device comprises:
- transmitting means for transmitting to said remote commander said identification information associated with said communication terminal device;

receiving means for receiving said searched program guide information transmitted from said remote commander;

notifying means for notifying the user of said received searched program guide information; and transmitting means for transmitting to a program selection apparatus program selection information upon selection of said program listed in said program guide information, a list of programs in said program guide is previously created and stored by said user and said previously created and stored list of programs in said program guide is remotely accessed by said user upon request on said communication terminal device.

20. The remote operating system according to claim 19, wherein said information receiving device further comprises recording control means for recording to recording means programs specified by said communication terminal device from a plurality of programs supplied from said program supplying means.

21. The remote operating system according to claim 19, wherein said preference information storing means is located adjacent said program selection apparatus.

22. The remote operating system according to claim 19, wherein said preference information is located at a remote location apart from said program selection apparatus.

23. The remote operating system according to claim 22, wherein said preference information is retrieved over a public network.

24. The remote operating system according to claim 22, wherein said preference information is stored at a website.

25. A program guide information providing method for a program guide information providing device for communicating with a communication terminal device, said method comprising the following steps:

storing in program guide information storing means program guide information indicating the contents of programs to be supplied by predetermined program supplying means;

storing preference information indicating the preferences of each of one or more users, wherein the preference information comprises information linking:

each of the one or more users;

a corresponding personal remote terminal device having a user operable input selector; and program information preferred by each of the users, wherein the personal remote terminal device is a cellular telephone communicates with the program guide information providing device via one of a plurality of communication terminal devices as a function of a cell area that the personal remote terminal device is located in, and generates a user registration screen as a function of pre-registered preference information, guides the one or more users to sequentially input program preference information, receives the program information preferred by the associated user, correlates the program preference information with an associated cellular telephone number, displays the program information, selects a program from the program guide information in response to user operation of said input selector, and displays audio and visual data of the selected program, wherein the personal remote terminal device can be used at any of a plurality of program guide information providing devices, and wherein the personal remote terminal device can be operated at a remote location from any of the plurality of program information providing devices, wherein the preference information is stored in a manner correlated with a telephone number of the personal remote terminal device of each of the one or more users;

receiving identification information from said communication terminal device indicative of the identification thereof, wherein the receiving step is in a predetermined position in the home allowing an information exchange with the communication terminal device via infrared and an information exchange with each of the plurality of personal remote terminal devices, wherein, when the personal remote terminal device is unable to communicate with the program guide information providing device, the personal remote terminal device communicates with a second personal remote terminal device which is able to communicate with the program guide information providing device and relay the information between the program guide information providing device and the personal remote terminal device;

reading from said preference information storing means said preference information corresponding to said identification information transmitted from said communication terminal device;

searching programs matching the preferences of said user from said program guide information based on said read preference information;

generating searched program guide information comprising said searched programs; and transmitting said searched program guide information to said communication terminal device;

wherein a program selection apparatus receives program selection information upon selection of one of said programs listed in said program guide information, a list of programs in said program guide is previously created and stored by said user and said previously created and stored list of programs in said program guide is remotely accessed by said user upon request on said communication terminal device.

26. The program guide information providing method for a program guide information providing device according to claim 25, further receiving programs supplied from said program supplying means.

27. The program guide information providing method according to claim 25, wherein said preference information storing means is located adjacent said program selection apparatus.

28. The program guide information providing method according to claim 25, wherein said preference information is located at a remote location apart from said program selection apparatus.

29. The program guide information providing method according to claim 28, wherein said preference information is retrieved over a public network.

30. The program guide information providing method according to claim 28, wherein said preference information is stored at a website.

31. A program guide information providing method for a program guide information providing system comprising a communication terminal device and a program guide information providing device for communicating with each other, said method comprising the following steps:

storing in program guide information storing means of said program guide information providing device, program guide information indicating the contents of programs to be supplied by predetermined program supplying means;

storing preference information indicating the preferences of each of one or more users, wherein the preference information comprises information linking:

each of the one or more users;

a corresponding personal remote terminal device having a user operable input selector; and program information preferred by each of the users, wherein the personal remote terminal device is a cellular telephone communicates with the program guide information providing device via one of a plurality of communication terminal devices as a function of a cell area that the personal remote terminal device is located in, and generates a user registration screen as a function of pre-registered preference information, guides the one or more users to sequentially input program preference information, receives the program information preferred by the associated user, correlates the program preference information with an associated cellular telephone number, displays the program information, selects a program from the program guide information in response to user operation of said input selector, and displays audio and visual data of the selected program, wherein the personal remote terminal device can be used at any of a plurality of program guide information providing devices, and wherein the personal remote terminal device can be operated at a remote location from any of the plurality of program information providing devices, storing the preference information in a manner correlated with a telephone number of the personal remote terminal device of each of the one or more users;

receiving identification information from said communication terminal device indicative of the identification thereof, wherein the receiving step is in a predetermined position in the home allowing an information exchange with the communication terminal device via infrared and an information exchange with each of the plurality of personal remote terminal devices, wherein, when the personal remote terminal device is unable to communicate with the program guide information providing device, the personal remote terminal device communicates with a second personal remote terminal device which is able to communicate with the program guide information providing device and relay the information between the program guide information providing device and the personal remote terminal device;

transmitting said identification information from said communication terminal device to said program guide information providing device;

reading from said preference information storing means said preference information corresponding to said received identification information, searching programs matching the preferences of said user from said program guide information based on said read preference information, and generating searched program guide information comprising said searched programs;

transmitting said searched program guide information to said communication terminal device from said guide information providing device;

receiving said searched program guide information transmitted from said program guide information providing device with said communication terminal device;

notifying the user of said received searched program guide information via notifying means; and transmitting to a program selection apparatus program selection information upon selection of one of said program listed in said program guide information, a list of programs in said program guide is previously created and stored by said user and said previously created and stored list of programs in said program guide is remotely accessed by said user upon request on said communication terminal device.

32. The program guide information providing method for a program guide information providing system according to claim 31, wherein said information providing device receives programs supplied from said program supplying means.

33. The program guide information providing method according to claim 31, wherein said preference information storing means is located adjacent said program selection apparatus.

34. The program guide information providing method according to claim 31, wherein said preference information is located at a remote location apart from said program selection apparatus.

35. The program guide information providing method according to claim 34, wherein said preference information is retrieved over a public network.

36. The program guide information providing method according to claim 34, wherein said preference information is stored at a website.

37. A program guide information providing method for an information receiving device for communicating with a communication terminal device, said method comprising the following steps:

storing program guide information indicating the contents of programs to be supplied by predetermined program supplying means to program guide information storing means of said information receiving device;

storing preference information indicating the preferences of each of one or more users, wherein the preference information comprises information linking:

each of the one or more users;

a corresponding personal remote terminal device having a user operable input selector; and program information preferred by each of the users, wherein the personal remote terminal device is a cellular telephone communicates with the information receiving device via one of a plurality of communication terminal devices as a function of a cell area that the personal remote terminal device is located in, and generates a user registration screen as a function of pre-registered preference information, guides the one or more users to sequentially input program preference information, receives the program information preferred by the associated user, correlates the program preference information with an associated cellular telephone number, displays the program information, selects a program from the program guide information in response to user operation of said input selector, and displays audio and visual data of the selected program, wherein the personal remote terminal device can be used at any of a plurality of program guide information providing devices, and wherein the personal remote terminal device can be operated at a remote location from any of the plurality of program information providing devices, storing the preference information in a manner correlated with a telephone number of the personal remote terminal device of each of the one or more users;

receiving identification information from said communication terminal device indicative of the identification thereof, wherein the receiving step is in a predetermined position in the home allowing an information exchange with the communication terminal device via infrared and an information exchange with each of the plurality of personal remote terminal devices, wherein, when the personal remote terminal device is unable to communicate with the program guide information providing device, the personal remote terminal device communicates with a second personal remote terminal device which is able to communicate with the program guide information providing device and relay the information between the program guide information providing device and the personal remote terminal device;

transmitting said received identification information from a remote commander to said information receiving device;

receiving said identification information transmitted from said remote commander with said information receiving device;

reading from said preference information storing means said preference information corresponding to said received identification information;

searching programs matching the preferences of said user from said program guide information based on said read preference information;

generating searched program guide information comprising said searched programs;

transmitting said searched program guide information from said information receiving device to said remote commander;

receiving said searched program guide information transmitted from said information receiving device with said remote commander; and transmitting said received searched program guide information from said remote commander to said communication terminal device;

wherein a program selection apparatus receives program selection information upon selection of one of said programs listed in said program guide information, a list of programs in said program guide is previously created and stored by said user and said previously created and stored list of programs in said program guide is remotely accessed by said user upon request on said communication terminal device.

38. The program guide information providing method for an information receiving device according to claim 37, wherein said information receiving device records to recording means programs specified by said communication terminal device from a plurality of programs supplied from said program supplying means.

39. A remote operating method for a remote operating system wherein a communication terminal device and an information receiving device are for communicating with each other, said method comprising the following steps:

storing program guide information indicating the contents of programs to be supplied by predetermined program supplying means to program guide information storing means of said information receiving device;

storing preference information indicating the preferences of each of one or more users, wherein the preference information comprises information linking:

each of the one or more users;

a corresponding personal remote terminal device having a user operable input selector; and program information preferred by each of the users, wherein the personal remote terminal device is a cellular telephone communicates with the information receiving device via one of a plurality of communication terminal devices as a function of a cell area that the personal remote terminal device is located in, and generates a user registration screen as a function of pre-registered preference information, guides the one or more users to sequentially input program preference information, receives the program information preferred by the associated user, correlates the program preference information with an associated cellular telephone number, displays the program information, selects a program from the program guide information in response to user operation of said input selector, and displays audio and visual data of the selected program, wherein the personal remote terminal device can be used at any of a plurality of program guide information providing devices, and wherein the personal remote terminal device can be operated at a remote location from any of the plurality of program information providing devices, storing the preference information in a manner correlated with a telephone number of the personal remote terminal device of each of the one or more users;

receiving identification information from said communication terminal device indicative of the identification thereof, wherein the receiving step is in a predetermined position in the home allowing an information exchange with the communication terminal device via infrared and an information exchange with each of the plurality of personal remote terminal devices, wherein, when the personal remote terminal device is unable to communicate with the program guide information providing device, the personal remote terminal device communicates with a second personal remote terminal device which is able to communicate with the program guide information providing device and relay the information between the program guide information providing device and the personal remote terminal device;

transmitting said identification information from said communication terminal device to a remote commander connected to said communication means;

transmitting said received identification information from said remote commander to said information receiving device;

receiving said identification information transmitted from said remote commander with said information receiving device;

reading from said preference information storing means said preference information corresponding to said received identification information;

searching programs matching the preferences of said user from said program guide information based on said read preference information;

generating searched program guide information comprising said searched programs;

transmitting said searched program guide information from said information receiving device to said remote commander;

receiving said searched program guide information transmitted from said information receiving device with said remote commander;

transmitting said received searched program guide information from said remote commander to said communication terminal device;

receiving said searched program guide information transmitted from said remote commander with said communication terminal device;

notifying the user of said received searched program guide information via notifying means; and transmitting to a program selection apparatus program selection information upon selection of one of said program listed in said program guide information, a list of programs in said program guide is previously created and stored by said user and said previously created and stored list of programs in said program guide is remotely accessed by said user upon request on said communication terminal device.

40. The remote operating method for a remote operating system according to claim 39, wherein said information receiving device further records to recording means programs specified by said communication terminal device from a plurality of programs supplied from said program supplying means.

* * * * *